3,662,072
FEEDSTUFF CONTAINING SALICYL SALICYLIC ACID

Ingvar Wiberger, Karlskoga, Sweden, assignor to
Aktiebolaget Bofors, Bofors, Sweden
No Drawing. Filed Apr. 1, 1970, Ser. No. 24,850
Claims priority, application Sweden, Apr. 3, 1969,
4,857/69
Int. Cl. A61k 27/00
U.S. Cl. 424—230                               2 Claims

ABSTRACT OF THE DISCLOSURE

A feedstuff, primarily intended for pigs and poultry, said stuff containing salicyl salicylic acid as a growth stimulant.

---

The present invention relates to feedstuff which is primarily intended for pigs and poultry, and more especially to feedstuff containing a growth stimulant.

It is known that, when used as an additive in feedstuff, salicylic acid and acetyl salicylic acid have a stimulating effect on the growth of pigs, hens and calves and the production of hens' eggs. These growth stimulating compounds are usually added to the feedstuff in quantities ranging from 150 to 300 mg. per kg. feedstuff, since these quantities have been found to give the best results. Although the effect produced by the compounds is known, the processes which lie behind the effect have not yet been established. It has been observed, however, that the effect is approximately the same for salicylic acid and acetyl salicylic acid.

It has now surprisingly been discovered that the growth stimulating effect obtained when using salicyl salicylic acid as a fodder additive, primarily in feedstuff for pigs and poultry, is far greater than that obtained when using salicylic acid or acetyl salicylic acid.

The invention consequently relates to a feedstuff containing salicyl salicylic acid as a growth stimulant. The compound is suitably added in quantities ranging from 50 to 500 mg. per kg. feedstuff, although optimal effect is usually obtained with a quantity of 200 mg. per kg. feedstuff.

The invention will now be illustrated in the following example, which shows an account of a comparison test made with feedstuff having no additive and feedstuff having additions of salicylic acid, acetyl salicylic acid and salicyl salicylic acid respectively.

EXAMPLE

A total of 134 farrows of young pigs divided into four groups was used in the test. The average number of stillborn and living piglets was observed at the moment of birth, together with the average weight within each group. After rearing the piglets for three weeks, a count was made of the number of living and the average weight within each group. This was repeated after five and eight weeks of rearing, whereafter the experiment was ceased. The average growth per animal per day was observed from the sixth to the eighth week. The average amount of feed consumed per kg. growth and the death rate calculated in percent were also established during this three-week period.

For the basic diet, and simultaneous control, was used a feedstuff containing 4 gr. of oleandomycine per ton and having the following composition:

|  | Parts by weight |
|---|---|
| Crushed wheat | 30.0 |
| Crushed oats | 30.0 |
| Groats | 13.5 |
| Fish meal | 7.5 |
| Meat meal | 2.0 |
| Soya flour | 8.0 |
| Glycose (grape-sugar) | 6.0 |
| Common salt | 0.5 |
| Feed lime | 0.5 |
| Vitamin mixture | 1.0 |
| Mixture of respective feed additives | 1.0 |
| Total | 100.0 |

The additive was varied in the four test groups, so that group 1, which was the check group, comprised solely carrier material, group 2 comprised carrier and 200 gr. of acetyl salicylic acid per ton feedstuff, group 3 comprised carrier and 200 gr. of salicyl salicylic acid per ton feedstuff and group 4 comprised carrier and 200 gr. of salicylic acid per ton feedstuff.

The results obtained are shown in the following table:

TABLE

[Average number of pigs in each farrow and average weight in kilograms at birth, at 3, 5, and 8 weeks of age and the increase in weight in grams per animal per day, the amount in kilograms of food consumed per kilogram weight increase during the 6-8 weeks inclusive and the death rate in percent during the 6-8 weeks inclusive]

| Group | Number of farrows | Number of—Stillborn | Number of—Living | Birth at—Average weight | 3 weeks Number | 3 weeks Average weight | 5 weeks Number | 5 weeks Average weight | 8 weeks Number | 8 weeks Average weight | Growth per animal and day, weeks 6-8, grams | Feed consumed per kg. growth weeks 6-8, grams | Death rate weeks 6-8, percent |
|---|---|---|---|---|---|---|---|---|---|---|---|---|---|
| 1 | 31 | 0.7 | 10.7 | 1.41 | 8.9 | 5.3 | 8.7 | 7.9 | 8.3 | 13.0 | 238 | 2.65 | 4.5 |
| 2 | 34 | 0.9 | 10.3 | 1.41 | 8.0 | 5.2 | 7.6 | 8.5 | 7.4 | 13.6 | 238 | 2.77 | 2.6 |
| 3 | 33 | 0.4 | 11.1 | 1.42 | 8.6 | 5.4 | 8.5 | 8.6 | 8.3 | 14.3 | 275 | 2.41 | 2.4 |
| 4 | 36 | 0.6 | 9.9 | 1.44 | 7.9 | 5.4 | 7.6 | 8.5 | 7.3 | 13.5 | 245 | 2.74 | 3.9 |

It will be seen from the above table that group 3, in which the piglets were reared on feed containing salicyl salicylic acid, differs from the remainder. Compared with group 1, the check groups, the pigs in group 3 show an approximate 15% improved growth per pig per day during the sixth to eighth week inclusive and an approximate 10% lower food consumption per kg. of growth over the same period. The remaining groups, i.e. groups 2 and 4, differ only slightly from the check group. It will also be seen that the death rate of the pigs in group 3 was lower than in the remaining groups.

The condition of the sties (i.e. hygiene and environmental factors), in which the pigs were kept during the experiment, was relatively poor, which may have contributed to a large extent to the obtained differences in effect. It has been observed in later experiments, however, that good results also are obtained with salicyl salicylic acid when the pigs are housed in optimal conditions, whereas salicylic acid and acetyl salicylic acid did not produce the same good results under the same optimal conditions.

What is claimed is:
1. A feedstuff for pigs and poultry containing as a growth stimulant from about 50 to 500 mg. of salicyl salicylic acid per kilogram of feedstuff.
2. A feedstuff according to claim 1 which contains 200 mg. of salicyl salicylic acid per kilogram of feedstuff.

References Cited

UNITED STATES PATENTS

| | | | |
|---|---|---|---|
| 3,147,120 | 9/1964 | Caldwell | 424—230 |
| 3,493,663 | 2/1970 | Klatte | 424—230 |

SAM ROSEN, Primary Examiner